(12) United States Patent
Miki et al.

(10) Patent No.: US 9,073,595 B2
(45) Date of Patent: Jul. 7, 2015

(54) BICYCLE OPERATING DEVICE

(71) Applicant: SHIMANO INC., Sakai (JP)

(72) Inventors: Yoshimitsu Miki, Sakai (JP); Yasuhisa Watanabe, Sakai (JP); Kazutaka Fukao, Sakai (JP); Toshihiko Takeuchi, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 14/328,640

(22) Filed: Jul. 10, 2014

(65) Prior Publication Data

US 2015/0096406 A1   Apr. 9, 2015

Related U.S. Application Data

(62) Division of application No. 14/047,987, filed on Oct. 7, 2013.

(51) Int. Cl.
*B62K 23/02* (2006.01)
*B62K 23/06* (2006.01)
*B62K 21/12* (2006.01)

(52) U.S. Cl.
CPC ............... *B62K 23/02* (2013.01); *B62K 23/06* (2013.01); *B62K 21/12* (2013.01)

(58) Field of Classification Search
CPC ......... B62K 23/02; B62K 23/06; B62K 21/12
USPC .............................................. 74/501.6, 502.2
See application file for complete search history.

(56) References Cited

U.S. PATENT DOCUMENTS

| 4,428,697 | A | * | 1/1984 | Ruland | ........................ 403/344 |
| 4,974,469 | A | | 12/1990 | Romano | |
| 5,096,327 | A | * | 3/1992 | Ruland | ........................ 403/290 |
| 5,881,606 | A | * | 3/1999 | Roddy | ........................ 74/551.3 |
| 6,276,227 | B1 | | 8/2001 | Ose | |
| 8,061,667 | B2 | | 11/2011 | Weiss et al. | |
| 2002/0148323 | A1 | * | 10/2002 | Thomson et al. | ............ 74/551.1 |
| 2003/0047372 | A1 | | 3/2003 | Fechner | |

(Continued)

FOREIGN PATENT DOCUMENTS

JP    63-35688 U    3/1988
JP    1-157091 U   10/1989

OTHER PUBLICATIONS

Office Action with Form PTO-892 Notice of References Cited issued by the U.S. Patent and Trademark Office for the U.S. Appl. No. 14/047,987, Feb. 11, 2015.

*Primary Examiner* — Paul N Dickson
*Assistant Examiner* — Darlene P Condra
(74) *Attorney, Agent, or Firm* — Mori & Ward, LLP

(57) ABSTRACT

A bicycle operating device comprises a mounting clamp and a restricting structure. The mounting clamp is configured to be mounted to a bicycle tube member. The mounting clamp comprises a first radius portion, a second radius portion, and a clamp opening. The first radius portion defines a first inner radius. The second radius portion defines a second inner radius different from the first inner radius. The bicycle tube member is to extend through the clamp opening. The clamp opening is defined by the first radius portion and the second radius portion. The restricting structure is provided on the second radius portion and is configured to restrict relative movement between the second radius portion and an adapter member at least in a circumferential direction of the second radius portion.

6 Claims, 13 Drawing Sheets

(56) References Cited

U.S. PATENT DOCUMENTS

| | | |
|---|---|---|
| 2007/0137385 A1 | 6/2007 | Cesur et al. |
| 2007/0199401 A1 | 8/2007 | Kawakami et al. |
| 2007/0241531 A1* | 10/2007 | D'Aluisio et al. ............ 280/279 |
| 2010/0139442 A1 | 6/2010 | Tsumiyama |
| 2011/0083525 A1 | 4/2011 | Hirose et al. |
| 2011/0154939 A1 | 6/2011 | Watarai et al. |
| 2011/0253863 A1 | 10/2011 | Weiss et al. |
| 2013/0081507 A1 | 4/2013 | Fukao et al. |

\* cited by examiner

BICYCLE OPERATING DEVICE

CROSS-REFERENCE TO RELATED APPLICATIONS

The present application is a divisional application of the U.S. patent application Ser. No. 14/047,987 filed Oct. 7, 2013. The contents of this application are incorporated herein by reference in their entirety.

BACKGROUND OF THE INVENTION

1. Field of the Invention

The present invention relates to a bicycle operating device.

2. Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. Bicycles are often provided with a bicycle operating device for operating a bicycle component. The bicycle operating device generally includes an operating member to be operated by a rider for operating the bicycle component. The bicycle operating device has a structure in which a position of the bicycle operating device is adjustable relative to a base member to which the bicycle operating device is mounted. This allows the operating member of the bicycle operating device to be disposed at a preferable position for the rider.

SUMMARY OF THE INVENTION

In accordance with a first aspect of the present invention, a bicycle operating device comprises a mounting clamp and a restricting structure. The mounting clamp is configured to be mounted to a bicycle tube member. The mounting clamp comprises a first radius portion, a second radius portion, and a clamp opening. The first radius portion defines a first inner radius. The second radius portion defines a second inner radius different from the first inner radius. The bicycle tube member is to extend through the clamp opening. The clamp opening is defined by the first radius portion and the second radius portion. The restricting structure is provided on the second radius portion and is configured to restrict relative movement between the second radius portion and an adapter member at least in a circumferential direction of the second radius portion.

In accordance with a second aspect of the present invention, the bicycle operating device according to the first aspect is configured so that the second radius portion includes an inner peripheral surface defining the second inner radius. The restricting structure includes a restricting part provided on the inner peripheral surface of the second radius portion and is configured to restrict the relative movement between the second radius portion and the adapter member at least in the circumferential direction.

In accordance with a third aspect of the present invention, the bicycle operating device according to the second aspect is configured so that the restricting part includes a recess in which a protrusion of the adapter member is to be provided. The recess is provided on the inner peripheral surface of the second radius portion.

In accordance with a fourth aspect of the present invention, the bicycle operating device according to the first aspect is configured so that the restricting structure is configured to restrict the relative movement between the second radius portion and the adapter member in an axial direction defined along a longitudinal center axis of the bicycle tube member.

In accordance with a fifth aspect of the present invention, the bicycle operating device according to the first aspect further comprises an operating unit configured to operate a bicycle component. The mounting clamp is configured to releasably couple the operating unit to the bicycle tube member. The second radius portion is closer to the operating unit than the first radius portion.

In accordance with a sixth aspect of the present invention, the bicycle operating device according to the fifth aspect is configured so that the second inner radius is larger than the first inner radius.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
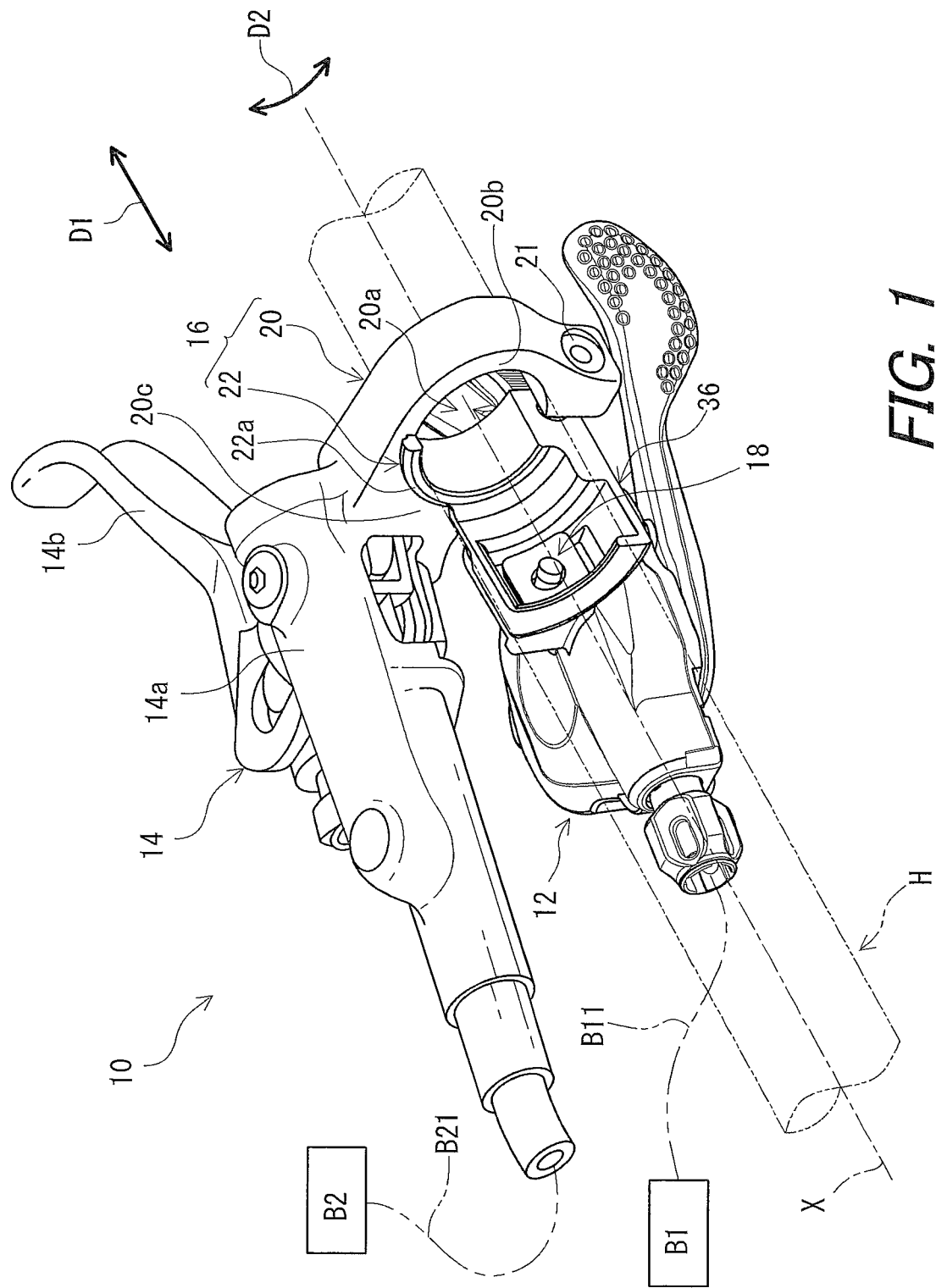
FIG. 1 is a perspective view of a bicycle operating device in accordance with a first embodiment.

The embodiments will now be described with reference to the accompanying drawings, wherein like reference numerals designate corresponding or identical elements throughout the various drawings.

First Embodiment

Figure 2:
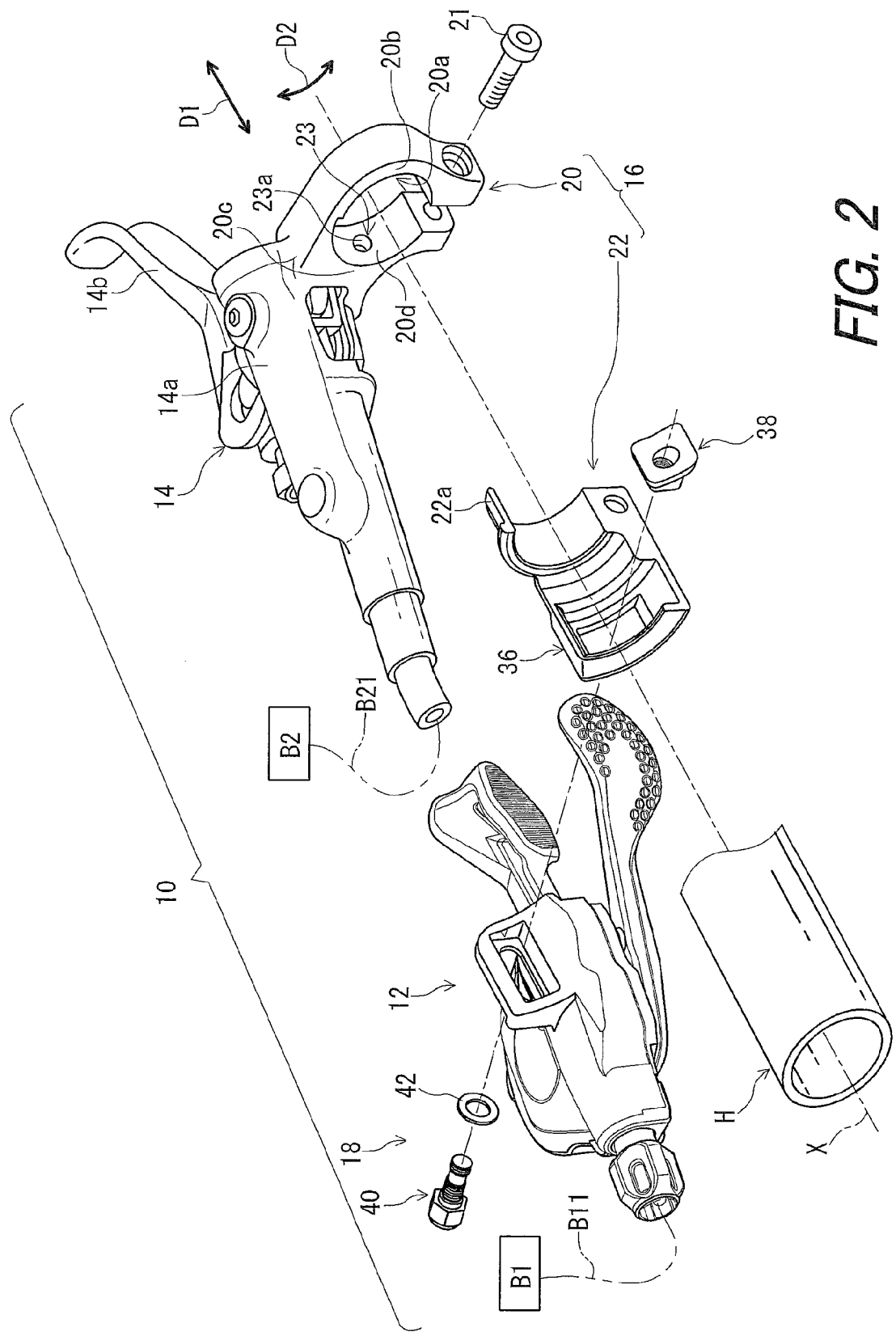
FIG. 2 is an exploded perspective view of a bicycle operating device illustrated in FIG. 1.

Referring initially to FIGS. 1 and 2, a bicycle operating device 10 in accordance with the first embodiment is configured to be attached to a bicycle tube member H of a bicycle for operating bicycle components. In the illustrated embodiment, the bicycle operating device 10 is configured to operate a bicycle gear changing component B1 such as a derailleur or an internal gear hub. The bicycle operating device 10 is further configured to operate a bicycle brake component B2 such as a bicycle rim brake device or a bicycle disc brake device. The bicycle tube member H is a bicycle handlebar having a tubular shape, for example. However, it will be apparent to those skilled in the bicycle field from the present disclosure that the bicycle operating device 10 can be configured to be attached to a tubular part of a bicycle frame other than the bicycle handlebar. The bicycle operating device 10 is a right bicycle operating device configured to be operated with a rider's right hand. However, it will be apparent to those skilled in the bicycle field from the present disclosure that the configuration of the bicycle operating device 10 can be applied to a left bicycle operating device.

In the present application, the following directional terms "front", "rear", "forward", "rearward", "left", "right", "transverse", "upward" and "downward" as well as any other similar directional terms refer to those directions which are determined on the basis of the rider who sits on a saddle (now shown) of the bicycle with facing the bicycle tube member H, for example. Accordingly, these terms, as utilized to describe the bicycle operating device 10, should be interpreted relative to the bicycle as used in an upright riding position on a horizontal surface.

As seen in FIGS. 1 and 2, the bicycle operating device 10 comprises an operating unit 12, an additional operating unit 14, a mounting member 16, and a positioning structure 18. The operating unit 12 is configured to operate a bicycle component such as the bicycle gear changing component B1. In the illustrated embodiment, the operating unit 12 comprises a shift operating unit configured to operate the bicycle gear changing component B1. The operating unit 12 is operatively coupled to the bicycle gear changing component B1 via an operation cable B11 such as a Bowden cable that basically includes an inner wire slidably received within an outer case. The bicycle gear changing component B1 is a conventional bicycle derailleur or internal transmission device that is configured to change speeds of a bicycle drive train (not shown). Thus, the bicycle gear changing component B1 will not be shown or described herein. However, it will be apparent to those skilled in the bicycle field from the present disclosure that the operating unit 12 can be used for operating other kinds of bicycle components (e.g., suspension devices) as needed and/or desired. Furthermore, the operating unit 12 can be operatively coupled to the bicycle gear changing component B1 via an electric cable or using a wireless technology. In such embodiment, the operating unit 12 includes an electric controller, and the bicycle gear changing component B1 includes an actuator configured to be controlled via the electric controller of the operating unit 12, for example.

The additional operating unit 14 is configured to operate an additional bicycle component such as the bicycle brake component B2 and is configured to be attached to the mounting member 16. In the illustrated embodiment, the additional operating unit 14 comprises a brake operating unit configured to operate the bicycle brake component B2. The additional operating unit 14 includes a main body 14a and a brake lever 14b. The brake lever 14b is configured to be pivotally provided relative to the main body 14a. The main body 14a has a master cylinder and a piston so as to generate hydraulic pressure in response to pivotal movement of the brake lever 14b. The additional operating unit 14 is operatively coupled to the bicycle brake component B2 via a hydraulic hose B21. While the additional operating unit 14 is a hydraulic brake operating unit, it will be apparent to those skilled in the bicycle field from the present disclosure that the additional operating unit 14 can be other kinds of brake operating units. Since the additional operating unit 14 includes well known structures, they will not be described in detail herein. Furthermore, the bicycle brake component B2 is a part of the conventional bicycle driving system. Thus, the bicycle brake component B2 will not be described in detail herein. However, it will be apparent to those skilled in the bicycle field from the present disclosure that the additional operating unit 14 can be used for operating other kinds of bicycle components (e.g., suspension devices) as needed and/or desired. The operating unit 12 and the additional operating unit 14 are configured to be attached to the bicycle tube member H via the mounting member 16.

As seen in FIG. 2, the mounting member 16 is configured to be mounted to the bicycle tube member H and includes a mounting clamp 20 and an adapter member 22. Namely, the bicycle operating device 10 comprises the mounting clamp 20. The mounting clamp 20 is configured to be mounted to the bicycle tube member H. The mounting clamp 20 is configured to clamp the bicycle tube member H. The mounting clamp 20 comprises a clamp opening 20a through which the bicycle tube member H is to extend. The mounting clamp 20 is configured to couple the additional operating unit 14 to the bicycle tube member H. In the illustrated embodiment, the mounting clamp 20 is integrally provided with the main body 14a of the additional operating unit 14. However, it will be apparent to those skilled in the bicycle field from the present disclosure that the mounting clamp 20 can be a separate member from the additional operating unit 14. The mounting clamp 20 is configured to releasably couple the operating unit 12 to the bicycle tube member H. The mounting clamp 20 is configured to be tightened with a clamping bolt 21 for releasably coupling the additional operating unit 14 to the bicycle tube member H. In the illustrated embodiment, the mounting clamp 20 is integrally provided as a one-piece unitary member. However, it will be apparent to those skilled in the bicycle field from the present disclosure that the mounting clamp 20 can include separate members.

The mounting clamp 20 comprises a first radius portion 20b and a second radius portion 20c. The first radius portion 20b defines a first inner radius. The second radius portion 20c defines a second inner radius different from the first inner radius. In the illustrated embodiment, the second inner radius is larger than the first inner radius. In other words, the mounting clamp 20 has an elongated diameter portion in the clamp opening 20a as the second radius portion 20c. The clamp opening 20a is defined by the first radius portion 20b and the second radius portion 20c. The second radius portion 20c includes an inner peripheral surface 20d defining the second inner radius. In the illustrated embodiment, the second radius portion 20c is closer to the operating unit 14 than the first radius portion 20b.

As seen in FIG. 2, the adapter member 22 is configured to be attached to the mounting clamp 20. The adapter member 22 has a connecting portion 22a configured to be detachably disposed within the clamp opening 20a. The mounting clamp 20 and the connecting portion 22a define a cylinder portion through which the bicycle tube member H is to extend. As seen in FIG. 1, the connecting portion 22a is disposed at the second radius portion 20c (the elongated diameter portion) such that the connecting portion 22a clamps the bicycle tube member H together with the mounting clamp 20 in a state where the mounting clamp 20 is tightened with the clamping bolt 21.

As seen in FIG. 2, the bicycle operating device 10 comprises a restricting structure 23 provided on the second radius portion 20c. The restricting structure 23 is configured to restrict relative movement between the second radius portion 20c and the adapter member 22 at least in a circumferential direction D2 of the second radius portion 20c. In the illustrated embodiment, the restricting structure 23 is configured to restrict the relative movement between the second radius portion 20c and the adapter member 22 in an axial direction D1 defined along a longitudinal center axis X of the bicycle tube member H in addition to the circumferential direction D2. The circumferential direction D2 is defined about the longitudinal center axis X of the bicycle tube member H.

The restricting structure 23 includes a restricting part 23a provided on the inner peripheral surface 20d of the second radius portion 20c. The restricting part 23a is configured to restrict the relative movement between the second radius portion 20c and the adapter member 22 at least in the circumferential direction D2. For example, the restricting part 23a includes a recess in which a protrusion 22b (FIG. 3) of the adapter member 22 is to be provided. The recess is provided on the inner peripheral surface 20d of the second radius portion 20c.

Figure 3:
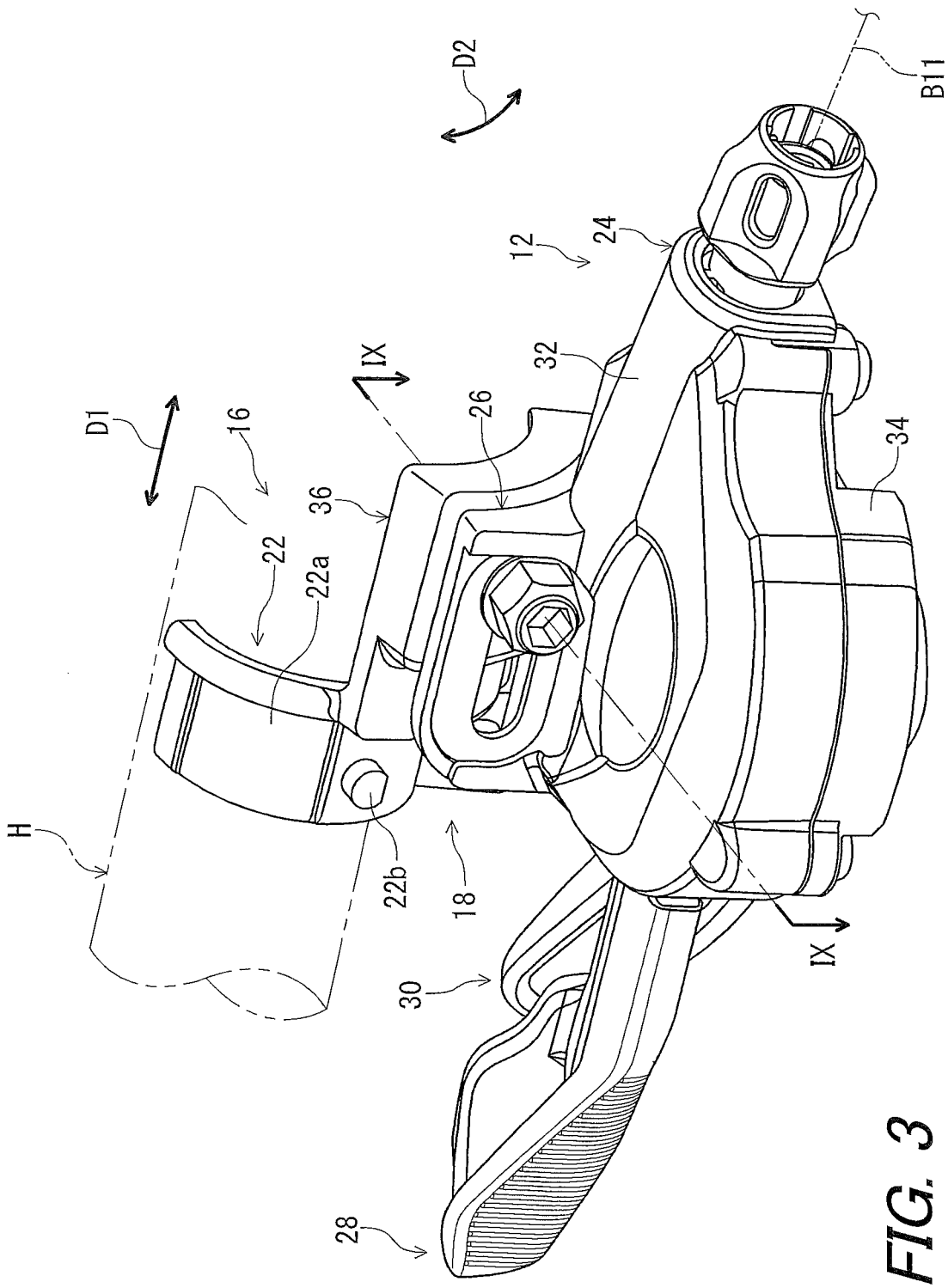
FIG. 3 is a perspective view of an operating unit and an adapter member of the bicycle operating device illustrated in FIG. 1.

As seen in FIG. 3, the adapter member 22 includes the protrusion 22b protruding radially outwardly from the connecting portion 22a. The protrusion 22b is configured to be provided in the restricting part 23a (the recess) (FIG. 2) provided at the second radius portion 20c (the elongated diameter portion) of the mounting clamp 20. The protrusion 22b and the restricting part 23a (the recess) prevent the adapter member 22 from moving relative to the mounting clamp 20 in a state where the connecting portion 22a is sandwiched between the mounting clamp 20 and the bicycle tube member H. Namely, the adapter member 22 is configured to be stationary relative to the additional operating unit 14 and the mounting clamp 20.

Returning to FIGS. 1 and 2, the bicycle operating device 10 is configured such that a position of the operating unit 12 is adjustable relative to the additional operating unit 14, the mounting clamp 20, and the adapter member 22 in a first direction (the axial direction D1) and a second direction (the circumferential direction D2). In the present application, the axial direction D1 of the bicycle tube member H is also referred to as the first direction D1, and the circumferential direction D2 is also referred to as the second direction D2. The operating unit 12 is configured to be connected with the adapter member 22 via the positioning structure 18 such that a position of the operating unit 12 is adjustable relative to the additional operating unit 14, the mounting clamp 20, and the adapter member 22 in the first direction D1 and the second direction D2. The bicycle tube member H extends in the first direction D1. The second direction D2 is different from the first direction D1.

Figure 4:
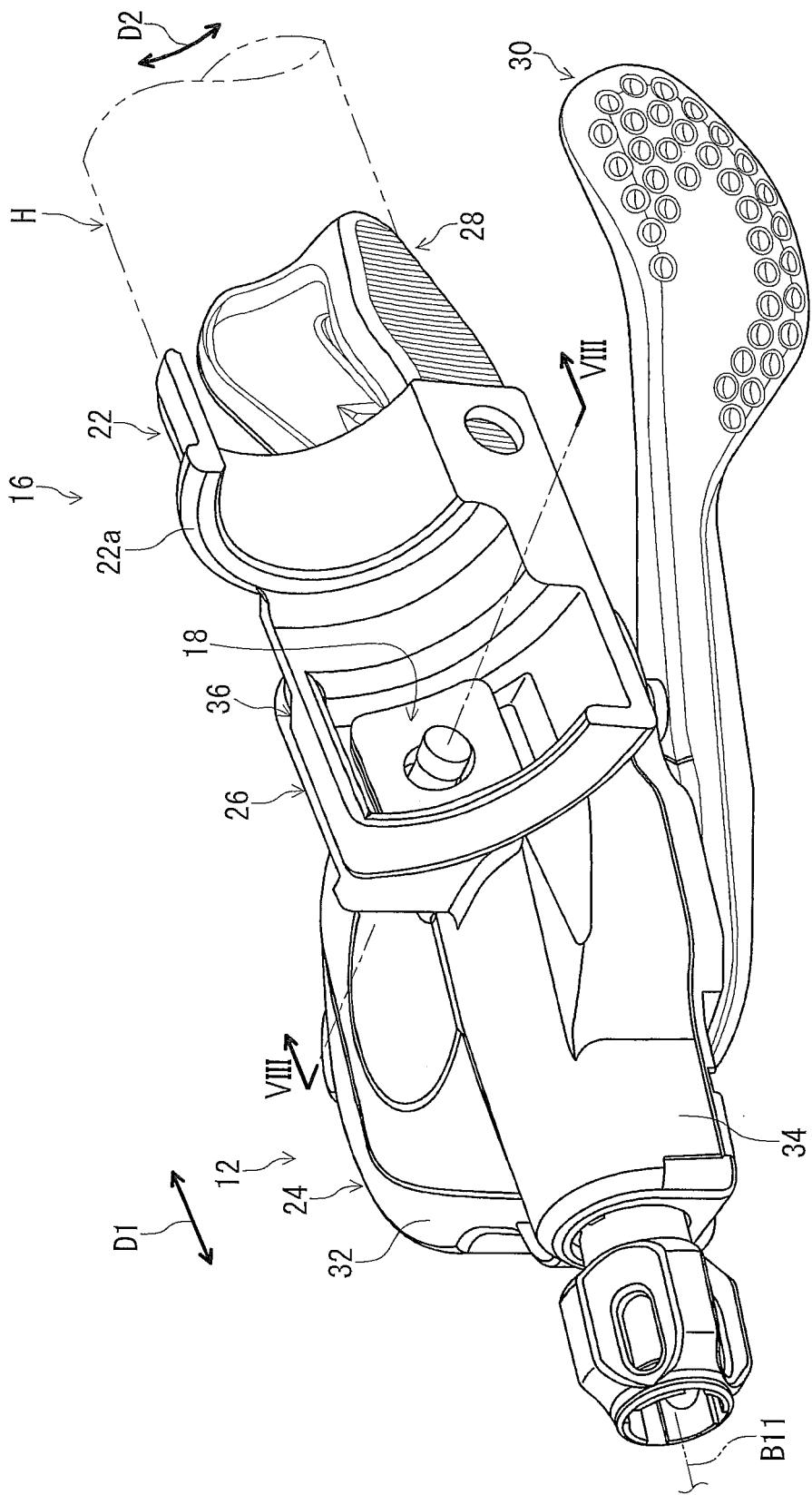
FIG. 4 is a perspective view of the operating unit and the adapter member of the bicycle operating device illustrated in FIG. 1.

As seen in FIGS. 3 and 4, the operating unit 12 includes a housing 24, a first portion 26, a first operating member 28, and a second operating member 30. The housing 24 includes a first housing member 32 and a second housing member 34. In the illustrated embodiment, the first housing member 32 is an upper housing, and the second housing member 34 is a lower housing disposed below the first housing member 32. The first housing member 32 and the second housing member 34 define an interior space in which a cable operating mechanism (described later) is provided. The first portion 26 is provided on the housing 24 and protrudes from the housing 24. In the illustrated embodiment, the first portion 26 is provided on the first housing member 32 and protrudes from the first housing member 32. The first operating member 28 is configured to be pivotally provided relative to the housing 24. The second operating member 30 is configured to be pivotally provided relative to the housing 24. The first operating member 28 and the second operating member 30 are configured to be operated by a rider to shift gears.

As seen in FIGS. 1 and 2, the mounting member 16 includes a second portion 36. As seen in FIGS. 3 and 4, in the illustrated embodiment, the second portion 36 is provided on the adapter member 22. The adapter member 22 and the second portion 36 are made of a hard and/or rigid material such as a resin material or a metallic material. In the illustrated embodiment, the adapter member 22 is a separate member from the mounting clamp 20. However, it will be apparent to those skilled in the bicycle field from the present disclosure that the adapter member 22 can be integrally provided with the mounting clamp 20 as a one-piece unitary member. Namely, the mounting member 16 can integrally provided as a one-piece unitary member. The second portion 36 can be integrally provided with the mounting clamp 20 as a one-piece unitary member. As seen in FIG. 1, the second portion 36 extends from the connecting portion 22a so as to project from the clamp opening 20a. The second portion 36 projects from the clamp opening 20a along the bicycle tube member H in a state where the mounting clamp 20 couples the adapter member 22 to the bicycle tube member H.

As seen in FIGS. 3 and 4, the second portion 36 is configured to be connected with the first portion 26 of the operating unit 12. More specifically, the second portion 36 is configured to be connected with the first portion 26 via the positioning structure 18 such that a position of the operating unit 12 is adjustable relative to the additional operating unit 14 and the mounting clamp 20 in the first direction D1 and the second direction D2.

Figure 5:
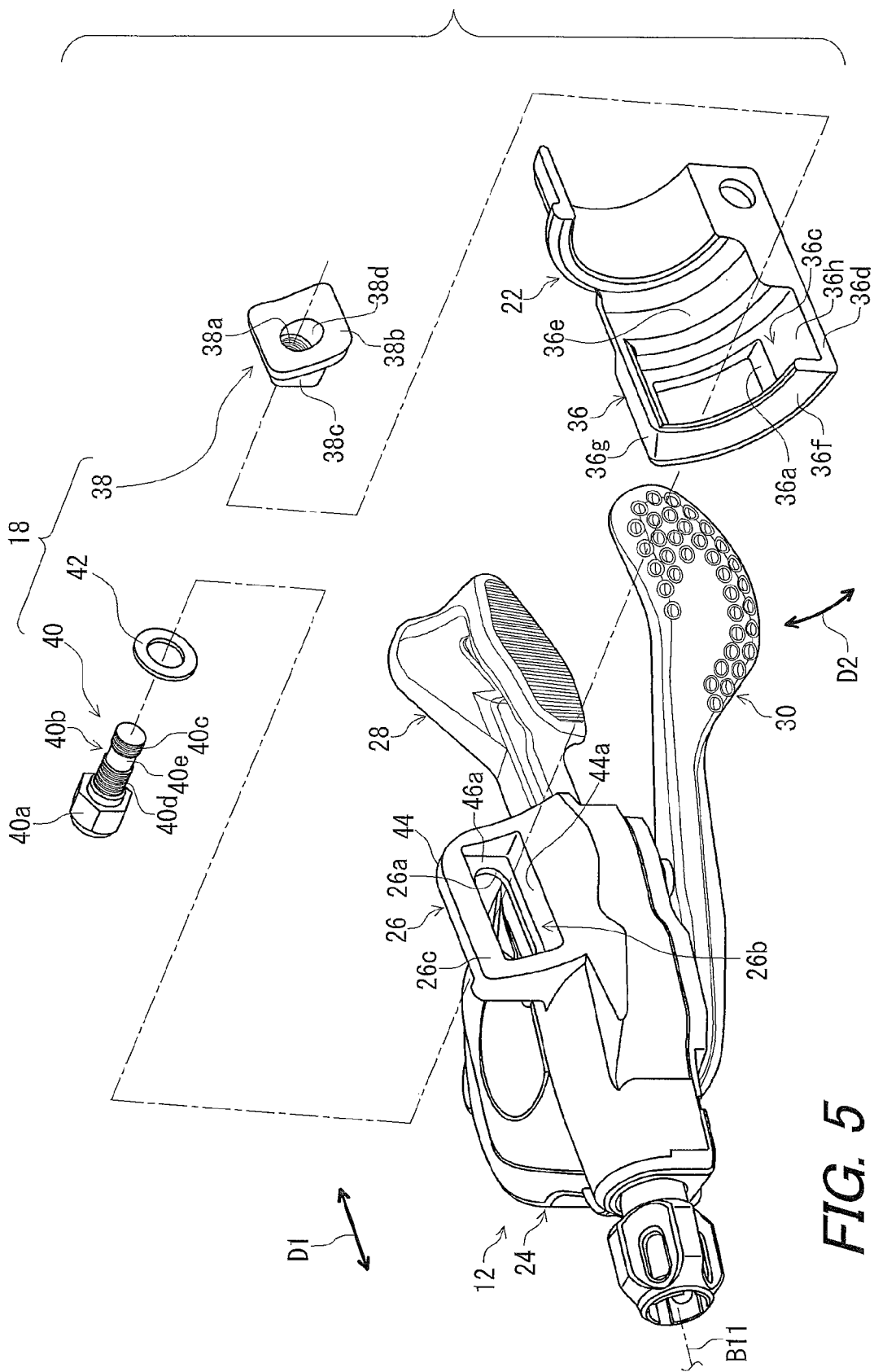
FIG. 5 is an exploded perspective view of the operating unit, the adapter member and a positioning structure of the bicycle operating device illustrated in FIG. 1.
Figure 6:
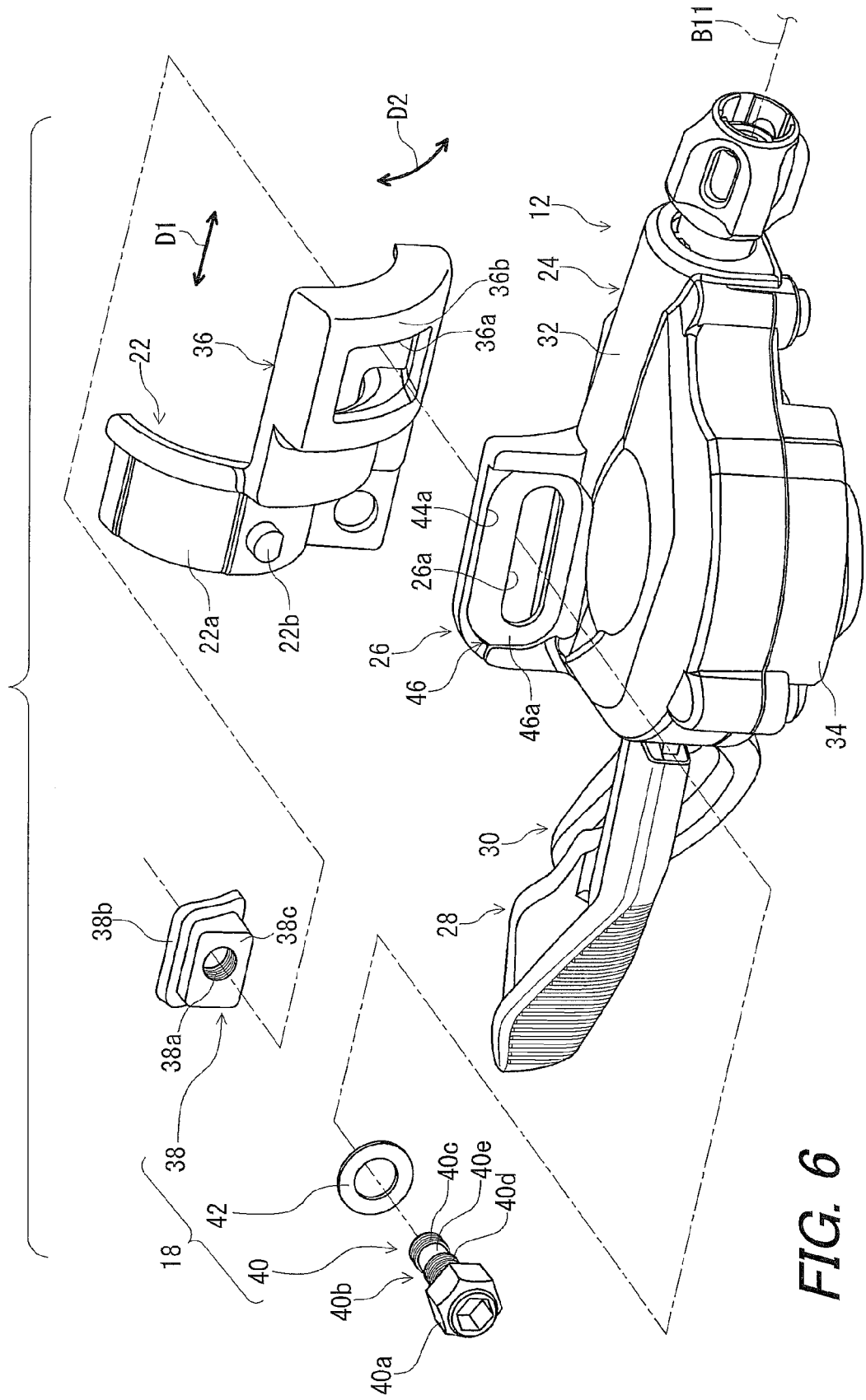
FIG. 6 is an exploded perspective view of the operating unit, the adapter member and the positioning structure of the bicycle operating device illustrated in FIG. 1.

As seen in FIGS. 5 and 6, the positioning structure 18 is configured to adjustably position the first portion 26 with respect to the second portion 36 in the first direction D1 and the second direction D2. The positioning structure 18 comprises an abutment member 38, a fixing member 40, and a washer 42. The abutment member 38 is arranged opposite to the first portion 26 with respect to the second portion 36. The fixing member 40 is configured to fix the second portion 36 with respect to the first portion 26 by sandwiching the second portion 36 between the first portion 26 and the abutment member 38. The washer 42 is configured to be provided between the first portion 26 and the fixing member 40.

As seen in FIGS. 5 and 6, the first portion 26 has a first elongated hole 26a extending in the first direction D1 and a first recess 26b at which the first elongated 26a hole is provided. The second portion 36 has a second elongated hole 36a extending in the second direction D2. The first elongated hole 26a and the second elongated hole 36a are through-holes through which the fixing member 40 is to extend. As seen in FIGS. 5 and 6, the first portion 26 has a first sliding surface 26c extending in the first and second directions D1 and D2. The second portion 36 has a second sliding surface 36b extending in the first and second directions D1 and D2. The first and second sliding surfaces 26c and 36b have corresponding curved shapes along the second direction D2 with respect to each other such that the first and second sliding surfaces 26c and 36b slidably contact with each other.

Figure 7:
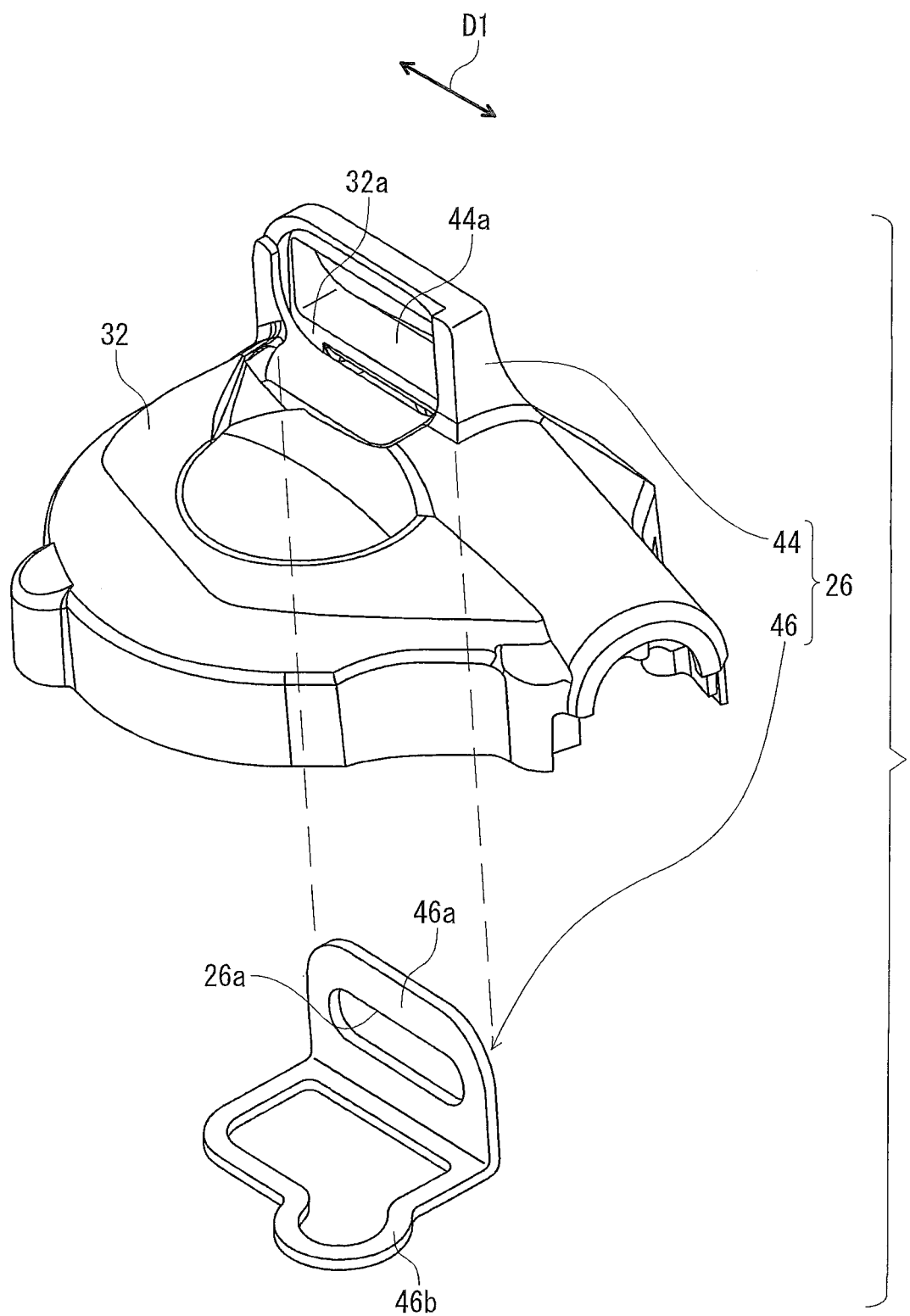
FIG. 7 is an exploded perspective view of a first portion of the operating unit illustrated in FIG. 6.

As seen in FIG. 7, the first portion 26 includes a protruding portion 44 and a support member 46. The protruding portion 44 protrudes from the first housing member 32. In the illustrated embodiment, the protruding portion 44 is integrally provided with the first housing member 32. However, it will be apparent to those skilled in the bicycle field from the present disclosure that the protruding portion 44 can be a separate member from the first housing member 32. The protruding portion 44 and the first housing member 32 are made of a hard and/or rigid material such as a resin material or a metallic material.

As seen in FIG. 7, the first elongated hole 26a is provided on the support member 46. The support member 46 is made of a hard and/or rigid material such as a resin material or a metallic material. The support member 46 is a separate member from the protruding portion 44. However, it will be apparent to those skilled in the bicycle field from the present disclosure that the support member 46 can be integrally provided with the protruding portion 44 as a one-piece unitary member.

As seen in FIG. 7, the support member 46 includes a first support portion 46a and a second support portion 46b. The first elongated hole 26a is provided on the first support portion 46a. The first housing member 32 includes a slot 32a extending in the first direction D1. The first support portion 46a is configured to extend through the slot 32a such that the first elongated hole 26a is provided outside the first housing member 32. The protruding portion 44 has a third elongated hole 44a extending in the first direction D1. The third elongated hole 44a and the first support portion 46a provide the first recess 26b extending in the first direction D1 (FIG. 5).

As seen in FIG. 5, the second portion 36 has a second recess 36c at which the second elongated hole 36a is provided. The second recess 36c extends in the second direction D2. More specifically, the second portion 36 includes a base portion 36d, a first wall portion 36e, a second wall portion 36f, and a third wall portion 36g. The base portion 36d has a curved shape along the second direction D2. The second elongated hole 36a is provided on the base portion 36d. The base portion 36d includes an abutment surface 36h configured to be in slidable contact with the abutment member 38.

As seen in FIG. 5, the first wall portion 36e is provided on the base portion 36d and protrudes from the base portion 36d. The first wall portion 36e extends along the second direction D2. The second wall portion 36f is provided on the base portion 36d and protrudes from the base portion 36d. The second wall portion 36f extends along the second direction D2. The second wall portion 36f is space apart from the first wall portion 36e in the first direction D1. The abutment member 38 is provided between the first wall portion 36e and the second wall portion 36f in the first direction D1. The third wall portion 36g is provided on the base portion 36d and protrudes from the base portion 36d. The third wall portion 36g couples an upper end of the first wall portion 36e to an upper end of the second wall portion 36f. The base portion 36d, the first wall portion 36e, the second wall portion 36f, and the third wall portion 36g define the second recess 36c.

As seen in FIGS. 5 and 6, the fixing member 40 is configured to pass through the first elongated hole 26a of the first portion 26 such that the first portion 26 is movable in the first direction D1 with respect to the fixing member 40. Furthermore, the fixing member 40 is configured to pass through the second elongated hole 36a of the second portion 36 such that the second portion 36 is movable in the second direction D2 with respect to the fixing member 40. The fixing member 40 has a head portion 40a and a shaft portion 40b. The shaft portion 40b extends from the head portion 40a and has at least one thread part. In this embodiment, the shaft portion 40b includes a first thread part 40c, a second thread part 40d, and an intermediate part 40e. The intermediate part 40e is arranged between the first thread part 40c and the second thread part 40d.

As seen in FIG. 5, the abutment member 38 has a threaded hole 38a in which the shaft portion 40b is screwed. More specifically, the abutment member 38 includes an abutment portion 38b, an insertion portion 38c, and an additional hole 38d. While the abutment member 38 is integrally provided, it will be apparent to those skilled in the bicycle field from the present disclosure that the abutment portion 38b can be a separate member from the insertion portion 38c. In the illustrated embodiment, the abutment member 38 is made of a hard and/or rigid material such as a resin material or a metallic material. The abutment portion 38b is configured to abut against the second portion 36. More specifically, the abutment portion 38b is arranged at the second recess 36c so as to slidably contact the abutment surface 36h of the second portion 36. The insertion portion 38c protrudes from the abutment portion 38b. The insertion portion 38c is configured to be inserted into the first recess 26b. The first recess 26b and the insertion portion 38c are configured to position the abutment member 38 with respect to the first portion 26 except for the first direction D1. Furthermore the insertion portion 38c is configured to be inserted into the second elongated hole 36a. The second elongated hole 36a and the insertion portion 38c are configured to position the abutment member 38 with respect to the second portion 36 except for the second direction D2. In other words, the first portion 26 and the abutment member 38 are configured to substantially prevent relative movement therebetween except for the first direction D1. The second portion 36 and the abutment member 38 are configured to substantially prevent relative movement therebetween except for the second direction D2.

Figure 8:
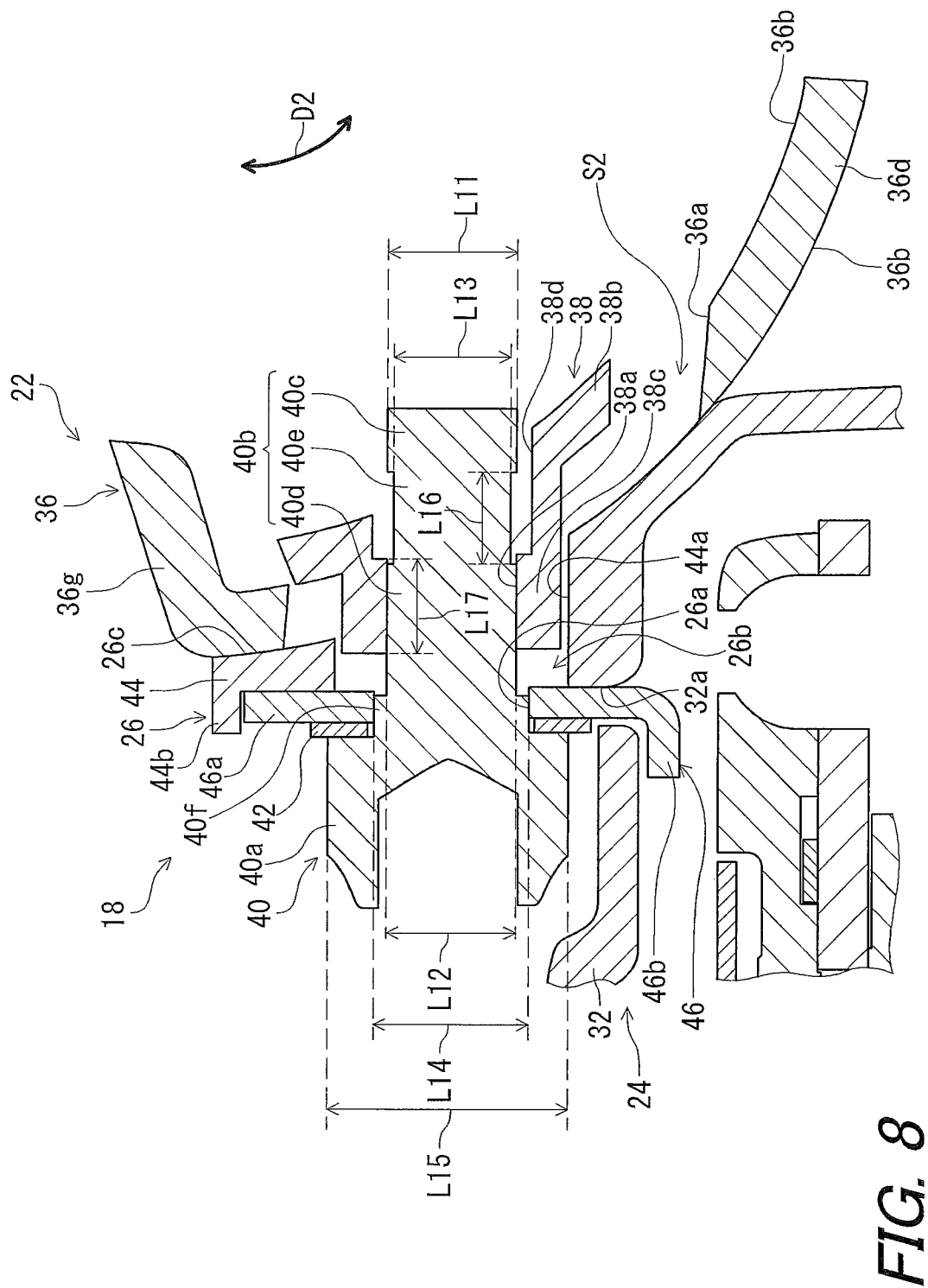
FIG. 8 is a partial cross-sectional view of the operating unit taken along line VIII-VIII of FIG. 4.
Figure 9:
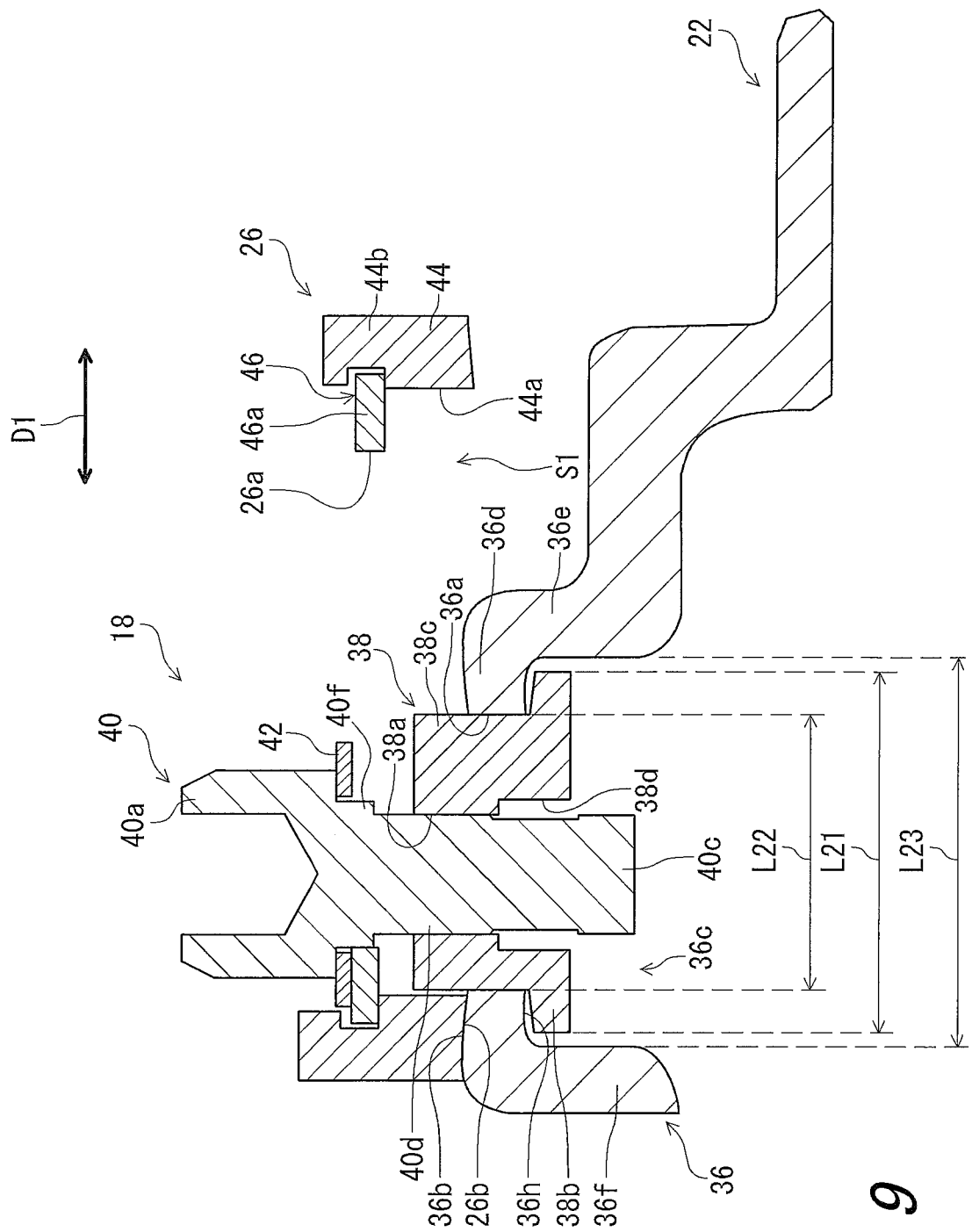
FIG. 9 is a partial cross-sectional view of the operating unit taken along line IX-IX of FIG. 3.

As seen in FIGS. 8 and 9, in a state where the fixing member 40 is tightened, the insertion portion 38c of the abutment member 38 is provided in the first recess 26b (the third elongated hole 44a) and the second elongated hole 36a. A space 51 (FIG. 9) is provided between the insertion portion 38c and the first recess 26b of the first portion 26 to achieve relative adjustability between the abutment member 38 and the first portion 26 in the first direction D1. A space S2 (FIG. 8) is provided between the insertion portion 38c and the second elongated hole 36a of the second portion 36 to achieve relative adjustability between the abutment member 38 and the second portion 36 in the second direction D2.

As seen in FIG. 8, the additional hole 38d is aligned with the threaded hole 38a and has an inner diameter larger than an inner diameter of the threaded hole 38a. The fixing member 40 extends through the threaded hole 38a and the additional hole 38d in a state where the second portion 36 is coupled to the first portion 26 by the fixing member 40. More specifically, the second thread part 40d is screwed in the threaded hole 38a in a state where the second portion 36 is fixed with respect to the first portion 26.

As seen in FIG. 8, the first thread part 40c has a first diameter L11. The first diameter L11 is a maximum outer diameter of the first thread part 40c. The second thread part 40d has a second diameter L12 equal to the first diameter L11. The second diameter L12 is a maximum outer diameter of the second thread part 40d. The second thread part 40d is arranged between the first thread part 40c and the head portion 40a. The intermediate part 40e has a third diameter L13 smaller than the first diameter L11 and the second diameter L12. The third diameter L13 is a maximum outer diameter of the intermediate part 40e. In the illustrated embodiment, the intermediate part 40e is free from a thread. In the illustrated embodiment, a length L16 of the intermediate part 40e of the fixing member 40 is substantially equal to a length L17 of the threaded hole 38a of the abutment member 38.

As seen in FIG. 8, the fixing member 40 includes a larger-diameter portion 40f provided between the head portion 40a and the second thread part 40d of the shaft portion 40b. The larger-diameter portion 40f has a fourth diameter L14. The head portion 40a has a fifth diameter L15. The fourth diameter L14 is larger than the first diameter L11, the second diameter L12, and the third diameter L13. The fifth diameter L15 is larger than the fourth diameter L14. The larger-diameter portion 40f is configured to be guided by the first portion 26. More specifically, the larger-diameter portion 40f is provided in the first elongated hole 26a and is configured to be in slidable contact with an inner periphery of the first elongated hole 26a.

As seen in FIG. 8, the washer 42 is provided between the head portion 40a and the first portion 26. In the illustrated embodiment, the washer 42 is sandwiched between the head portion 40a and the first support portion 46a of the support member 46 of the first portion 26 in a state where the second portion 36 is fixed with respect to the first portion 26. The washer 42 and the first support portion 46a are sandwiched between the head portion 40a and the protruding portion 44 of the first portion 26 in a state where the second portion 36 is fixed with respect to the first portion 26. The washer 42 can be eliminated if needed and/or desired.

As seen in FIG. 9, the insertion portion 38c of the abutment portion 38 is provided in the second elongated hole 36a and the third elongated hole 44a. The abutment portion 38b of the abutment portion 38 is configured to be provided in the second recess 36c and is configured to be in slidable contact with the abutment surface 36h. The abutment portion 38b has a first length L21 larger than a second length L22 of the second elongated hole 36a in the first direction D1. The insertion portion 38c is configured to be in slidable contact with the second elongated hole 36a. The first length L21 of the abutment portion 38b is smaller than a distance L23 between the first wall portion 36e and the second wall portion 36f in the first direction D1.

As seen in FIGS. 8 and 9, in a state where the fixing member 40 of the positioning structure 18 is tightened, the washer 42, the first portion 26 (i.e., the protruding portion 44 and the support member 46), and the second portion 36 are sandwiched between the head portion 44a of the fixing member 40 and the abutment portion 38b of the abutment member 38. This causes the first portion 26 and the operating unit 12 to be fixed with respect to the adapter member 22, the mounting clamp 20, and the additional operating unit 14. In a state where the fixing member 40 is loosened, the first portion 26 and the operating unit 12 is movable relative to the adapter member 22, the mounting clamp 20, and the additional operating unit 14 in the first direction D1 and the second direction D2. Thus, the positioning structure 18 allows the position of the operating unit 12 to be adjustably positioned relative to the additional operating unit 14 in the first direction D1 and the second direction D2. This allows the operating unit 12 to be positioned at a preferable position for a rider.

Figure 10:
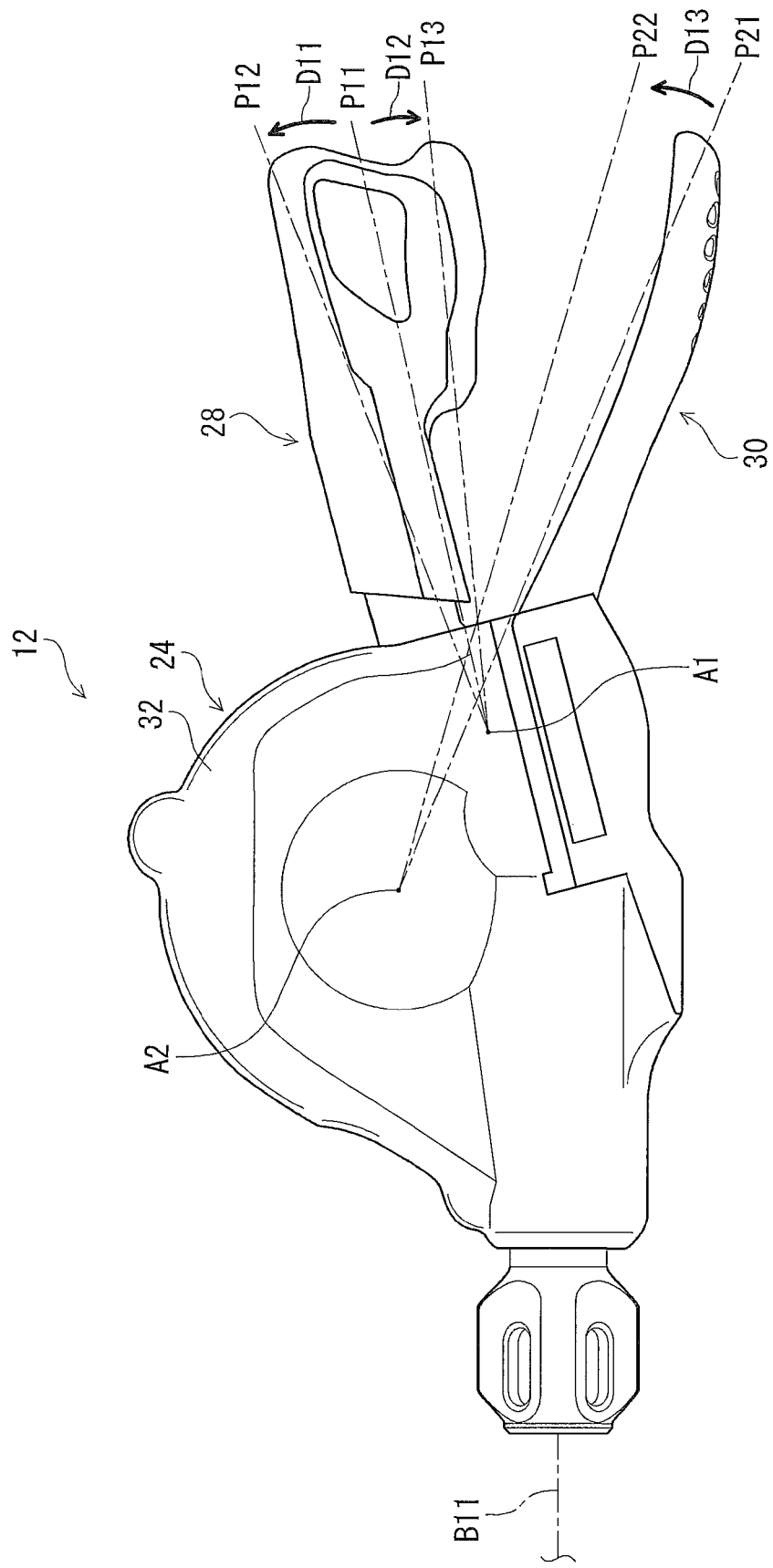
FIG. 10 is a top view of the operating unit illustrated in FIG. 3.

As seen in FIG. 10, the first operating member 28 of the operating unit 12 is configured to pivot between a first rest position P11 and a first operated position P12 and between the first rest position P11 and a second operated position P13. The first operating member 28 is configured to return from the first operated position P12 to the first rest position P11 after the first operating member 28 is operated from the first rest position P11 to the first operated position P12. The first operating member 28 is further configured to return from the second operated position P13 to the first rest position P11 after the first operating member 28 is operated from the first rest position P11 to the second operated position P13. Namely, the first operating member 28 is a trigger lever that is biased to the first rest position P11 relative to the housing 24. For example, the first operating member 28 is biased by a first return spring (not shown) to the first rest position P11 relative to the housing 24.

As seen in FIG. 10, the first operated position P12 is provided on an opposite side of the second operated position P13 with respect to the first rest position P11. The first operating member 28 is pivotally provided about a first pivot axis A1 relative to the housing 24. The first operating member 28 is configured to be pivoted about the first pivot axis A1 relative to the housing 24 from the first rest position P11 in both a first operating direction D11 and a second operating direction D12. However, it will be apparent to those skilled in the bicycle field from the present disclosure that the first operating member 28 can be configured to be operated only in one of the first operating direction D11 and the second operating direction D12 if needed and/or desired. In such embodiment, one of the first operated positions P12 and the second operated position P13 can be omitted. The second operating direction D12 is defined about the first pivot axis A1 to be opposite to the first operating direction D11.

As seen in FIG. 10, the second operating member 30 is configured to pivot between a second rest position P21 and a second operated position P22. The second operating member 30 is configured to return from the second operated position P22 to the second rest position P21 after the second operating member 30 is operated from the second rest position P21 to the second operated position P22. Namely, the second operating member 30 is a trigger lever that is biased to the second rest position P21 relative to the housing 24. For example, the second operating member 30 is biased by a second return spring (not shown) to the second rest position P21 relative to the housing 24. The second operating member 30 is pivotally provided about a second pivot axis A2 relative to the housing 24. In the illustrated embodiment, the second operating member 30 is configured to be pivoted about the second pivot axis A2 relative to the housing 24 from the second rest position P21 only in a third operating direction D13. However, it will be apparent to those skilled in the bicycle field from the present disclosure that the second operating member 30 can be configured to be operated in both the third operating direction D13 and an opposite direction of the third operating direction D13. The third operating direction D13 is defined about the second pivot axis A2. The second pivot axis A2 is parallel to the first pivot axis A1, but is offset from the first pivot axis A1.

In the present application, the term "rest position" as used herein refers to a position at which a movable part (e.g., the first operating member 28 and the second operating member 30) remains stationary in a state where the movable part is not operated by a rider. The term "operated position" as used herein refers to a position at which the movable part has been operated by a rider to perform the operation of the bicycle component such as the bicycle gear changing component B1.

While the operating unit 12 includes the first operating member 28 and the second operating member 30, it will be apparent to those skilled in the bicycle field from the present disclosure that one of the first operating member 28 and the second operating member 30 can be omitted if needed and/or desired.

As seen in FIG. 10, a cable take-up member (not shown) of the operating unit 12 is configured to be rotatable in a take-up direction in response to the pivotal movement of the second operating member 30. The cable take-up member is further configured to be rotatable in a releasing direction opposite to the take-up direction in response to the pivotal movement of the first operating member 28. Since such a cable operating mechanism has been known in the bicycle field, they will not be described in detail herein for the sake of brevity.

Second Embodiment

A bicycle operating device 210 in accordance with the second embodiment will be described below referring to FIGS. 11 to 13. Elements having substantially the same function as those in the first embodiment will be numbered the same here, and will not be described again in detail.

Figure 11:
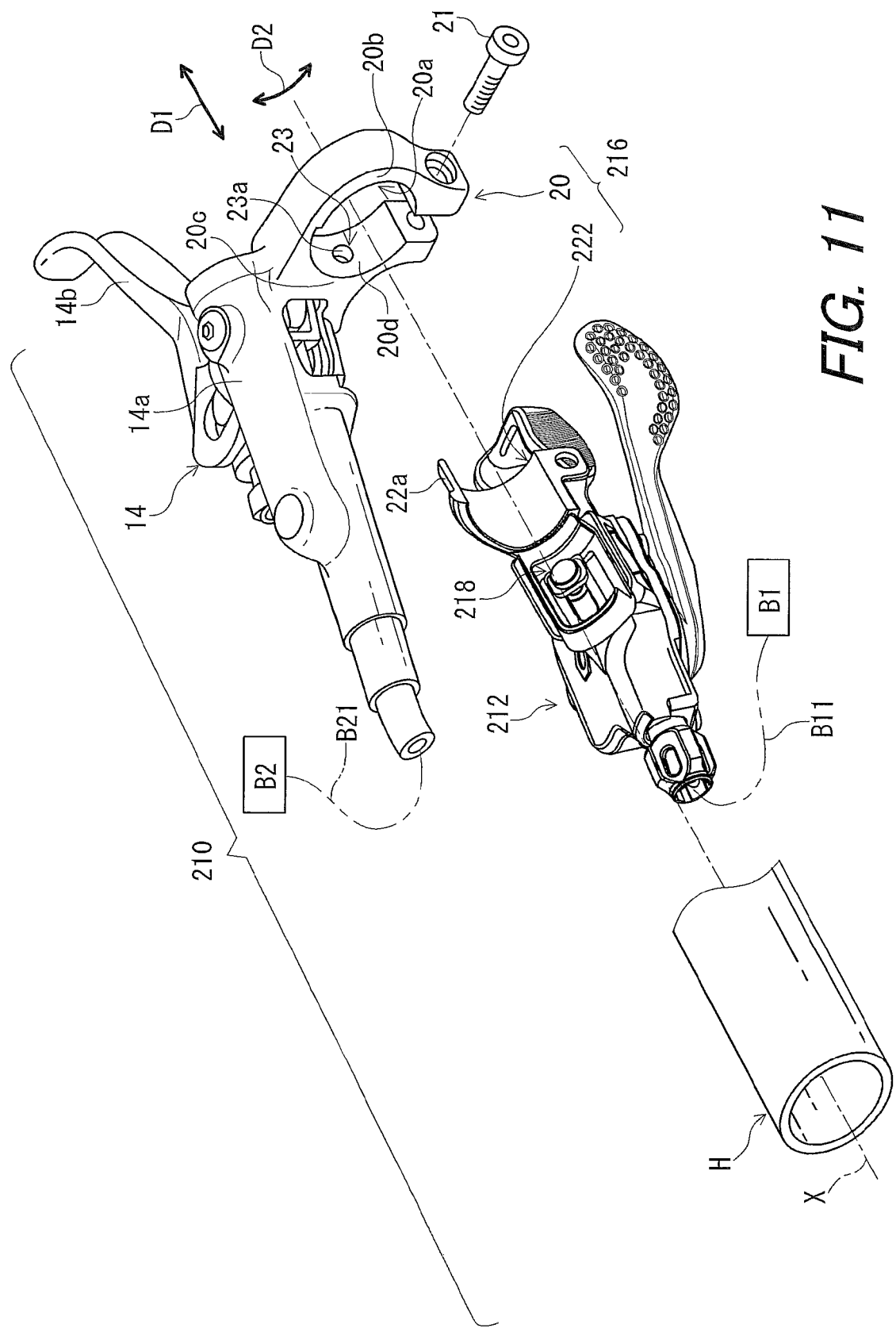
FIG. 11 is an exploded perspective view of a bicycle operating device in accordance with a second embodiment.

As seen in FIG. 11, the bicycle operating device 210 comprises an operating unit 212, the additional operating unit 14, a mounting member 216, and a positioning structure 218. The operating unit 212 is configured to operate a bicycle component such as the bicycle gear changing component B1. The mounting member 216 is configured to be mounted to the bicycle tube member H. The mounting member 216 includes the mounting clamp 20 and an adapter member 222. The adapter member 222 is configured to be attached to the mounting clamp 20. The positioning structure 218 is configured such that a position of the operating unit 212 is adjustable relative to the bicycle tube member H in the first direction D1 and the second direction D2.

Figure 12:
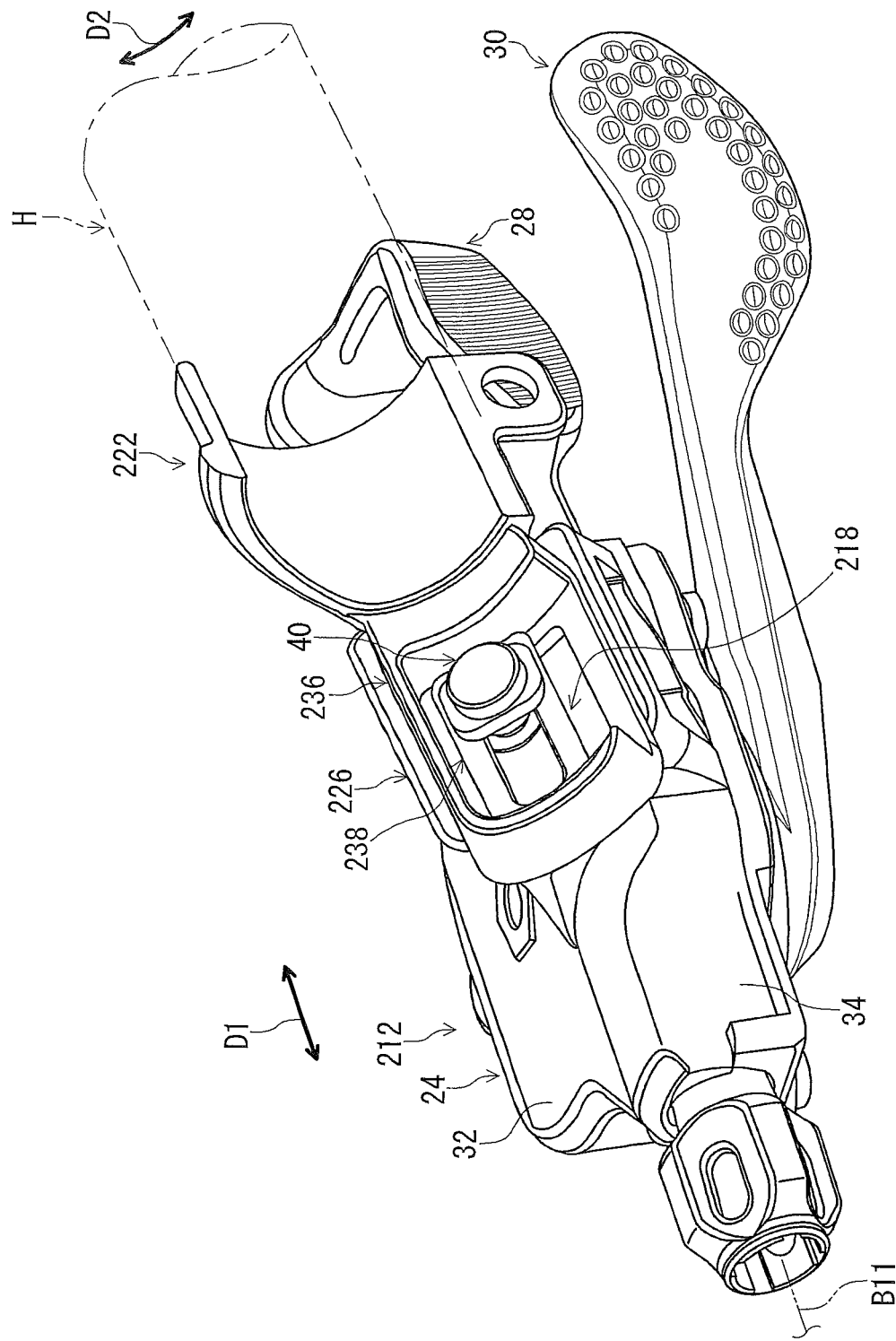
FIG. 12 is a perspective view of an operating unit and an adapter member of the bicycle operating device illustrated in FIG. 11.

As seen in FIG. 12, the operating unit 212 includes a first portion 226, the first operating member 28, and the second operating member 30. The mounting member 216 includes a second portion 236 configured to be connected with the first portion 226 of the operating unit 212. The positioning structure 218 is configured to adjustably position the first portion 226 with respect to the second portion 236 in the first direction D1 and the second direction D2.

Figure 13:
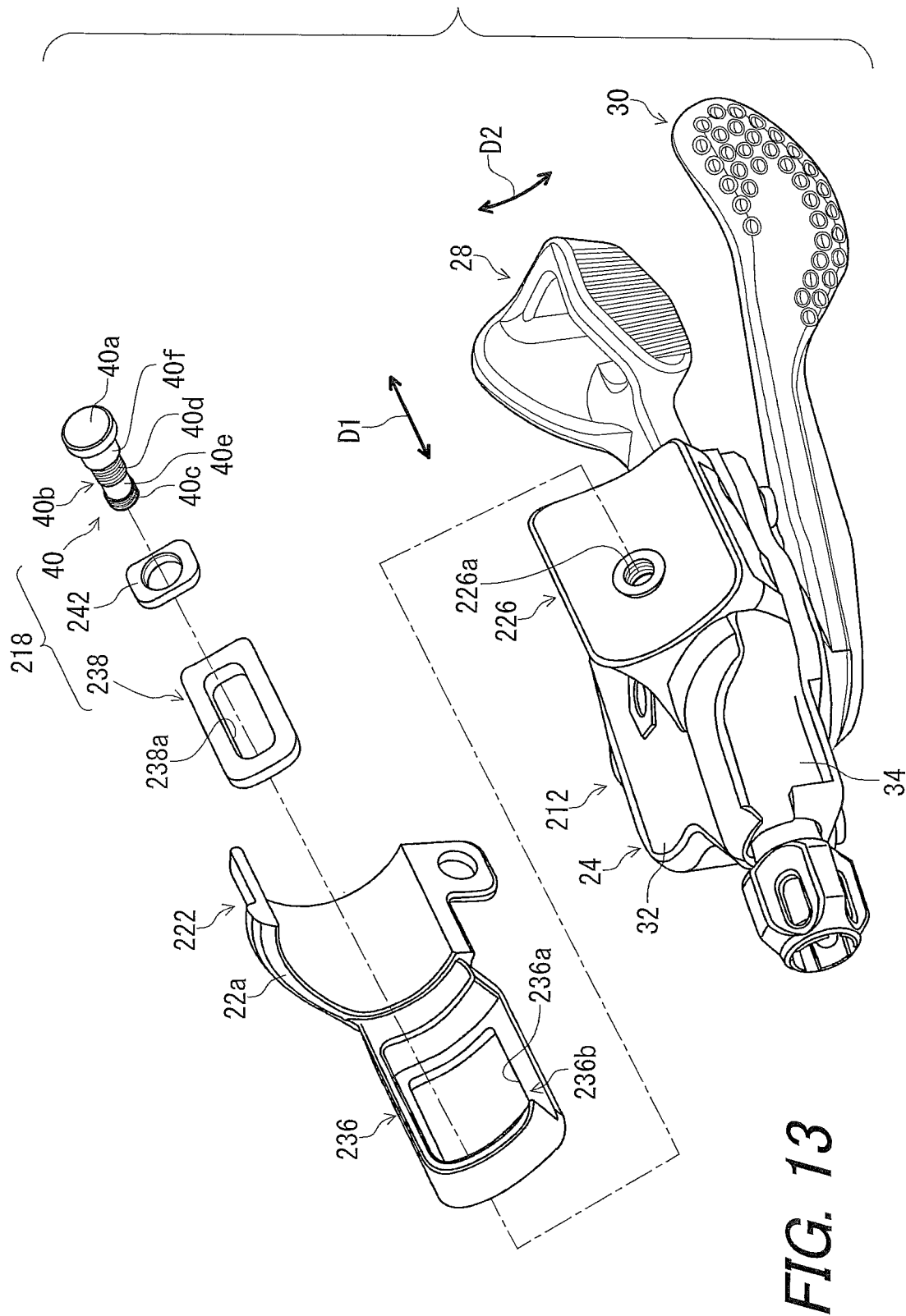
FIG. 13 is an exploded perspective view of the operating and the adapter member unit illustrated in FIG. 12.

As seen in FIG. 13, the positioning structure 218 comprises an abutment member 238, the fixing member 40, and a washer 242. The abutment member 238 is arranged opposite to the first portion 226 with respect to the second portion 236. The second portion 236 is provided on the adapter member 222. The second portion 236 has an opening 236a and a recess 236b at which the opening 236a is provided. The abutment member 238 is arranged at the recess 236b. The abutment member 238 includes an elongated hole 238a extending in the first direction D1.

As seen in FIG. 13, the fixing member 40 extends through the elongated hole 238a and the opening 236a in a state where the second portion 236 is fixed with respect to the first portion 226. The fixing member 40 is configured to fix the second portion 236 with respect to the first portion 226 by sandwiching the second portion 236 between the first portion 226 and the abutment member 238.

As seen in FIG. 12, the first portion 226 includes an attaching hole 226a having an internal thread. The second thread part 40d of the fixing member 40 is screwed in the attaching hole 226a in a state where the second portion 236 is fixed with respect to the first portion 226. The washer 242 is sandwiched between the head portion 40a of the fixing member 40 and the abutment member 238.

As well as the first embodiment, the positioning structure 218 allows the position of the operating unit 212 to be adjustably positioned relative to the additional operating unit 14 in the first direction D1 and the second direction D2. This allows the operating unit 212 to be positioned at a preferable position for a rider.

In the above embodiments, the term "attached" or "attaching", as used herein, encompasses configurations in which an element directly attached to another element by affixing the element is directly to the other element; configurations in which the element is indirectly attached to the other element via the intermediate member(s); and configurations in which one element is integral with another element, i.e. one element is essentially part of the other element. This concept also applies to words of similar meaning, for example, "joined", "connected", "coupled", "mounted", "bonded", "fixed" and their derivatives.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" or "element" when used in the singular can have the dual meaning of a single part or a plurality of parts.

The ordinal numbers in the terms "first", "second" or the like recited in the present application are merely identifiers, but do not have any other meanings, for example, a particular order and the like. Moreover, for example, the term "first element" itself does not imply an existence of "second element", and the term "second element" itself does not imply an existence of "first element."

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle operating device comprising:
a mounting clamp configured to be mounted to a bicycle tube member and comprising:
a first radius portion defining a first inner radius;
a second radius portion defining a second inner radius different from the first inner radius; and
a clamp opening through which the bicycle tube member is to extend, the clamp opening being defined by the first radius portion and the second radius portion; and
a restricting structure provided on the second radius portion and configured to restrict relative movement between the second radius portion and an adapter member at least in a circumferential direction of the second radius portion.

2. The bicycle operating device according to claim 1, wherein
the second radius portion includes an inner peripheral surface defining the second inner radius, and
the restricting structure includes a restricting part provided on the inner peripheral surface of the second radius portion and configured to restrict the relative movement between the second radius portion and the adapter member at least in the circumferential direction.

3. The bicycle operating device according to claim 2, wherein
the restricting part includes a recess in which a protrusion of the adapter member is to be provided, and
the recess is provided on the inner peripheral surface of the second radius portion.

4. The bicycle operating device according to claim 1, wherein
the restricting structure is configured to restrict the relative movement between the second radius portion and the adapter member in an axial direction defined along a longitudinal center axis of the bicycle tube member.

5. The bicycle operating device according to claim 1, further comprising:
an operating unit configured to operate a bicycle component, wherein
the mounting clamp is configured to releasably couple the operating unit to the bicycle tube member, and the second radius portion is closer to the operating unit than the first radius portion.

6. The bicycle operating device according to claim 5, wherein the second inner radius is larger than the first inner radius.

* * * * *